US012566086B1

(12) United States Patent
Cao et al.

(10) Patent No.: US 12,566,086 B1
(45) Date of Patent: Mar. 3, 2026

(54) FLUID PARAMETER MEASUREMENT DEVICE WITH ANNULAR GAP

(71) Applicant: Suzhou University of Technology, Jiangsu (CN)

(72) Inventors: Cheng Cao, Jiangsu (CN); Jianfeng Guan, Jiangsu (CN); Yuchen Pan, Jiangsu (CN); Jun Wei, Jiangsu (CN); Mengxiang Huang, Jiangsu (CN); Hui Yang, Jiangsu (CN)

(73) Assignee: Suzhou University of Technology, Changshu (CN)

( * ) Notice: Subject to any disclaimer, the term of this patent is extended or adjusted under 35 U.S.C. 154(b) by 0 days.

(21) Appl. No.: 19/234,240

(22) Filed: Jun. 10, 2025

(30) Foreign Application Priority Data

Sep. 4, 2024 (CN) .......................... 202411232367.6

(51) Int. Cl.
  *G01F 15/18*     (2006.01)
  *G01F 3/38*      (2006.01)

(52) U.S. Cl.
  CPC .............. *G01F 15/185* (2013.01); *G01F 3/38* (2013.01)

(58) Field of Classification Search
  CPC . G01F 15/185; G01F 3/38; G01F 1/00; G01F 15/068; G01F 1/66; G01F 1/86; G01F 1/684; G01F 1/42; G01F 1/7086; G01F 1/667; G01F 1/44; G01F 1/363; G01F 1/696; G01F 1/3218; G01F 1/662; G01N 25/18; G01N 25/005; G01N 29/222; G01N 21/05; G01N 15/0826; G01N 33/48785; G01N 21/3563; G01N 11/08; G01N 29/02; G01N 21/3504
  See application file for complete search history.

(56) References Cited

U.S. PATENT DOCUMENTS

2015/0233746 A1*   8/2015   Igarashi ..................... G01F 1/42
                                                    73/861.61
2017/0097646 A1*   4/2017   Igarashi ................ F16K 31/046

FOREIGN PATENT DOCUMENTS

CN          105606337 A      5/2016
CN          105738039 A      7/2016

* cited by examiner

*Primary Examiner* — Brandi N Hopkins

(57) ABSTRACT

Disclosed is a fluid parameter measurement device with an annular gap, including a base, a core column, and a swing block. The base is fixed to the core column and pivot-connected to the swing block. The core column penetrates a through hole in the swing block, sealed at both ends with elastic sealing rings to form an annular gap between a wall of the core column and that of the through hole. The core column contains fluid inlet and outlet channels connecting both ends of the annular gap, directing pressurized liquid through the annular gap. An adjustment assembly on the base alters core column-to-through hole concentricity while maintaining parallelism, enabling flow measurement under varying pressures or at constant pressure with adjustable eccentricity. The design simplifies experimental operations through precise concentricity regulation and eccentricity-based gap state control.

9 Claims, 4 Drawing Sheets

FLUID PARAMETER MEASUREMENT DEVICE WITH ANNULAR GAP

CROSS-REFERENCE TO RELATED APPLICATION

This application claims priority of Chinese Patent Application No. 202411232367.6, filed on Sep. 4, 2024, the entire contents of which are incorporated herein by reference.

TECHNICAL FIELD

The disclosure relates to the technical field of physical measurement, and in particular to a fluid parameter measurement device with an annular gap.

BACKGROUND

The study of fluid parameters within an annular gap is of great significance in both fluid mechanics research and engineering practices. Currently, fluid parameter measurement devices with an annular gap have a fixed structure, that is, corresponding devices are respectively required for studying annular gaps formed by concentric structures and annular gaps formed by eccentric structures. Under different pressures of fluids, leakage rates at the outlet are measured, thereby measuring the quantity of flow in maximum eccentric and concentric states under different pressures. The degree of eccentricity of the annular gap cannot be changed in these devices, unfavorable for rapidly changing the degree of eccentricity to conduct multiple measurements in teaching and research. Additionally, in an annular gap structure formed by an outer sleeve and an inner core, maintaining axis parallelism between the outer sleeve and the inner core is also important for measurement.

SUMMARY

In view of the deficiencies existing in the prior art mentioned above, the disclosure provides a fluid parameter measurement device with an annular gap, which solves the problem that the degree of eccentricity of the annular gap cannot be adjusted and ensures the axis parallelism between an outer sleeve and an inner core.

The technical solutions of the disclosure are as follows: a fluid parameter measurement device with an annular gap includes a base platform, a core column and a swing block. The core column is fixedly connected to the base platform, and the swing block is connected to the base platform via a rotating shaft; a through hole is disposed on the swing block, and the core column is arranged inside the through hole in a penetration manner; the core column and two ends of the through hole are sealed with elastic sealing rings, and a surface of the core column and an inner wall of the through hole form an annular gap; a fluid inlet channel and a fluid outlet channel are disposed at the core column, the fluid inlet channel and the fluid outlet channel are in communication with two ends of the annular gap, respectively, and a pressurized liquid enters the annular gap through the fluid inlet channel and flows out of the fluid outlet channel; and an adjustment assembly is arranged at the base platform, and the adjustment assembly pushes the swing block to rotate to alter a concentric degree between the surface of the core column and the inner wall of the through hole.

Furthermore, to facilitate adjustment and stabilize the swing block, the adjustment assembly includes elastic members and an adjustment screw, the elastic members and the adjustment screw are positioned on two sides of the swing block, respectively, and when the adjustment screw rotates, an elastic force exerted by the elastic members on the swing block is changed.

Furthermore, to precisely control a degree of eccentricity between the swing block and the core column, a distance sensor is arranged on the base platform, and the distance sensor is configured to measure a swing distance of the swing block.

Furthermore, the distance sensor is a micrometer gauge or a dial gauge.

Furthermore, spiropyran polyurethane force-induced color-changing rings are arranged between the swing block and the core column, the spiropyran polyurethane force-induced color-changing rings are sleeved on the core column, and the swing block is transparent at a position of the spiropyran polyurethane force-induced color-changing ring. When the swing block is eccentric to the core column, different positions of the spiropyran polyurethane force-induced color-changing ring show different colors, so as to facilitate the intuitive display of the eccentricity of the annular gap, which is convenient for learners to observe.

Furthermore, to improve the flow stability and evenness of the fluid passing through the annular gap, an annular gap segment is arranged on the core column, a surface of the annular gap segment and the inner wall of the through hole form the annular gap, a fluid inlet annular groove and a fluid outlet annular groove are disposed at two ends of the annular gap segment, respectively, a plurality of fluid inlet openings in communication with the fluid inlet channel are disposed at a circumferential direction of the fluid inlet annular groove, and a plurality of fluid outlet openings in communication with the fluid outlet channel are disposed at a circumferential direction of the fluid outlet annular groove.

Furthermore, the fluid inlet openings are evenly distributed at the circumferential direction of the fluid inlet annular groove, and the fluid outlet openings are evenly distributed at the circumferential direction of the fluid outlet annular groove.

Furthermore, an inlet of the fluid inlet channel and an outlet of the fluid outlet channel are disposed at the two ends of the core column.

Furthermore, to facilitate measuring the quantity of flow, the outlet of the fluid outlet channel is connected to a measuring cylinder.

Furthermore, the measuring cylinder is fixedly connected to the base platform, and a drain valve is arranged at a bottom of the measuring cylinder.

The advantages of the technical solutions provided in the disclosure lie in that:

with the arrangement of the swing block, it rotates along its rotating shaft under the adjustment of the adjustment assembly to change the positional relationship with the core column, thereby adjusting the concentric degree between the core column and the through hole of the swing block, so that an annular gap structure with variable concentric degrees is obtained, so as to conduct corresponding experiments according to the needs. In this way, it can ensure that the axis of the through hole is always parallel to the axis of the core column during adjustment. The force-induced color-changing ring is employed to display the acting force between the swing block and the core column, thereby visually showing the eccentricity and facilitating the presentation to learners.

DETAILED DESCRIPTION

The disclosure is further described by reference to the embodiments. It is to be understood that these embodiments are merely used for describing the disclosure, rather than limiting the scope of the disclosure. Upon reading the specification, various equivalent modifications to the specification by a person skilled in the art fall within the scope defined by the claims attached to the specification.

Figure 1:
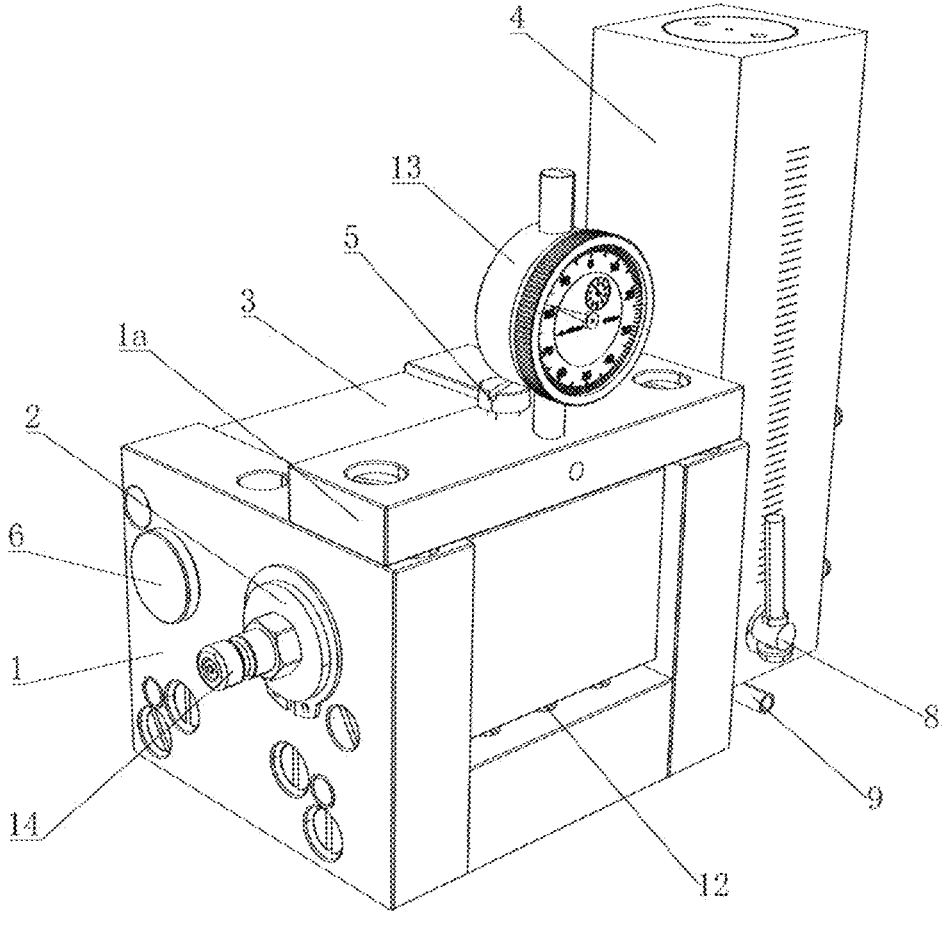
FIG. 1 is a perspective view of a fluid parameter measurement device with an annular gap.
Figure 2:
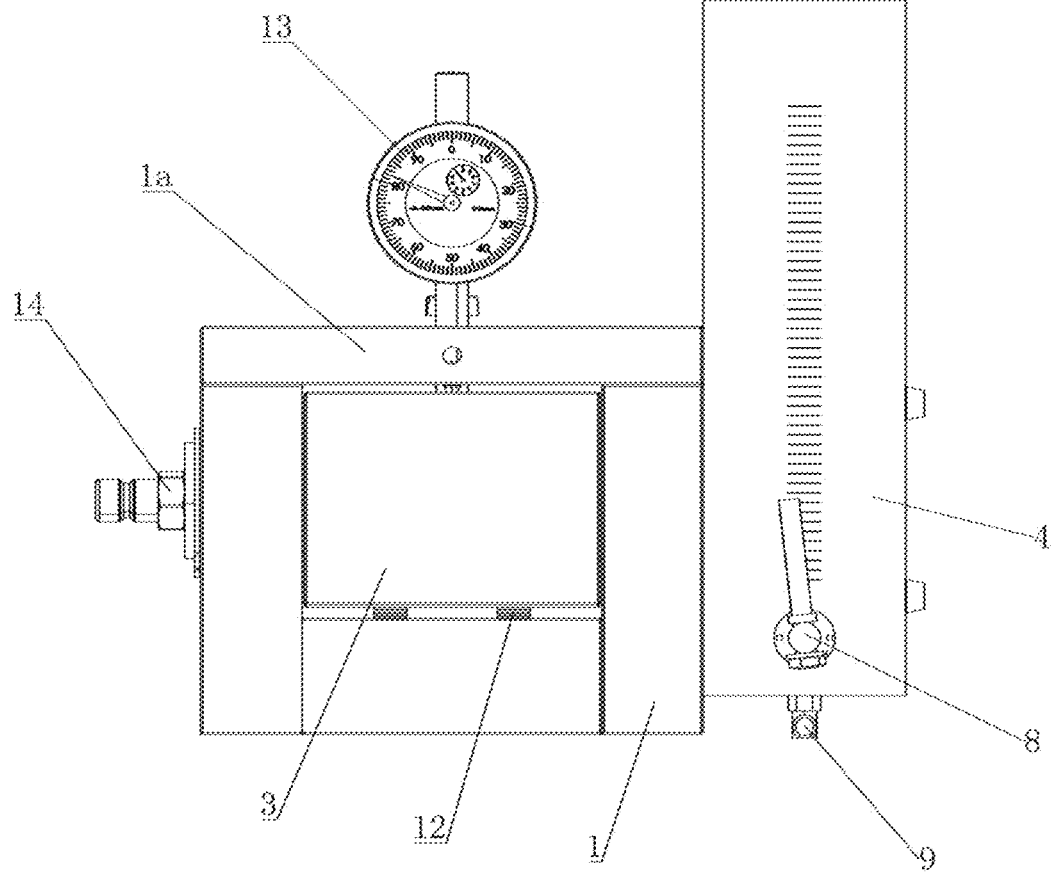
FIG. 2 is a front view of the fluid parameter measurement device with an annular gap.
Figure 3:
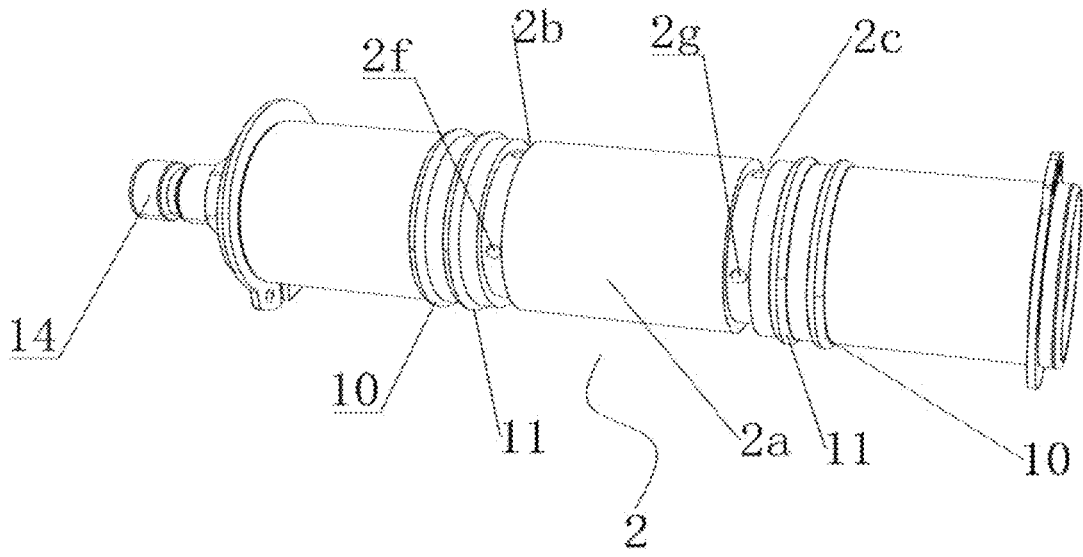
FIG. 3 is a schematic structural diagram of a core column.
Figure 4:
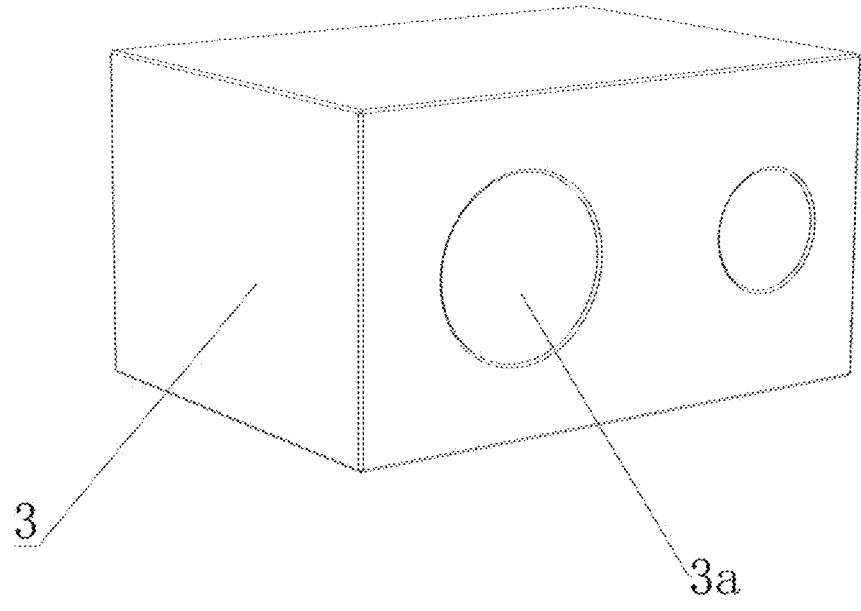
FIG. 4 is a schematic structural diagram of a swing block.
Figure 5:
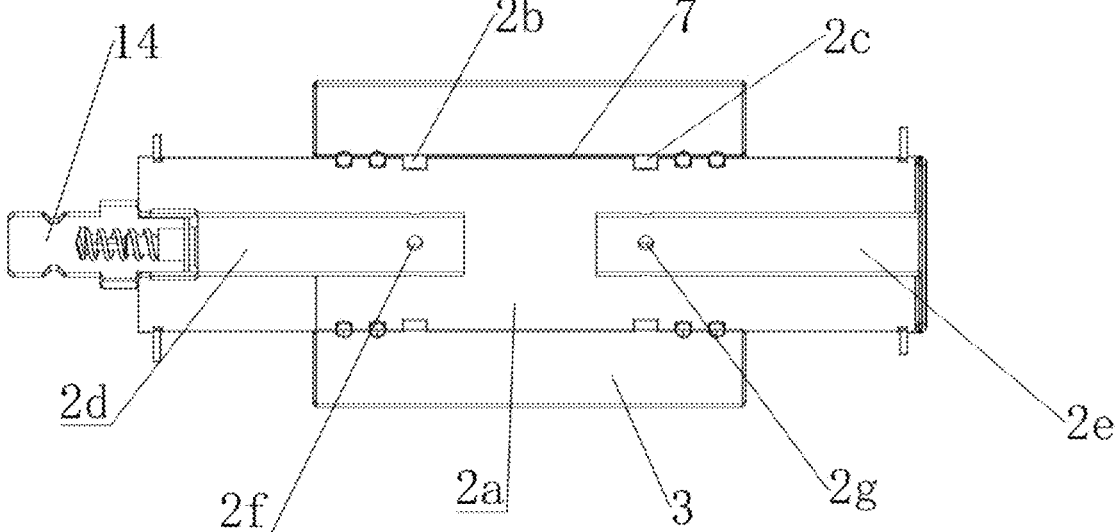
FIG. 5 is a schematic diagram of a sectional structure showing the fitting between the core column and the swing block.

Referring to FIG. 1 to FIG. 5, a fluid parameter measurement device with an annular gap involved in the embodiment includes a base platform 1, a core column 2, a swing block 3, an adjustment assembly and a measuring cylinder 4. A main body of the base platform 1 is a C-shaped structure with an upper opening. A cross beam 1*a* is arranged at a position of the upper opening, so as to mount an adjustment screw 5 within the adjustment assembly. The C-shaped base platform 1 has two side walls, and one core column 2 is fixed between the two side walls. Two ends of the core column 2 are fixedly connected to the two side walls, respectively.

One rotating shaft 6 is also fixed between the two side walls of the base platform 1, and the rotating shaft 6 is arranged parallel to an axis of the core column 2. The swing block 3 is made of transparent acrylic, and a rear portion of the swing block 3 is sleeved on the rotating shaft 6, enabling the swing block 3 to swing around the rotating shaft 6. One transverse through hole 3*a* is disposed at a front portion of the swing block 3, and the core column 2 is arranged inside the through hole 3*a* in a penetration manner. During the specific mounting, first, the swing block 3 is mounted on the rotating shaft 6, then the through hole 3*a* of the swing block 3 is aligned with core column mounting holes on the side walls of base platform 1, and the core column 2 is inserted through the aligned holes and is fixed between the side walls.

A middle segment of the core column 2 is an annular gap segment 2*a*, and an outer diameter of the annular gap segment 2*a* is smaller than a diameter of the through hole 3*a* on the swing block 3, so that after penetrating the core column 2 through the through hole 3*a*, an annular gap 7 is formed between a surface of the annular gap segment 2*a* and an inner wall of the through hole 3*a*. A fluid inlet annular groove 2*b* and a fluid outlet annular groove 2*c* are disposed at two ends of the annular gap segment 2*a* on the core column 2, respectively, and a fluid inlet channel 2*d* and a fluid outlet channel 2*e* are disposed at centers of the two ends of the core column 2. A plurality of fluid inlet openings 2*f* are evenly disposed and distributed along a circumferential direction within the fluid inlet annular groove 2*b*, and these fluid inlet openings 2*f* allow the fluid inlet channel 2*d* to be communicated with the fluid inlet annular groove 2*b*. A plurality of fluid outlet openings 2*g* are evenly disposed and distributed along a circumferential direction within the fluid outlet annular groove 2*c*, and these fluid outlet openings 2*g* allow the fluid outlet channel 2*e* to be in communication with the fluid outlet annular groove 2*c*. An inlet of the fluid inlet channel 2*d* formed at one end of the core column 2 is connected to a quick-connect plug 14, facilitating the injection of fluid into the core column 2. An outlet of the fluid outlet channel 2*e* is formed at the other end of the core column 2. A measuring cylinder 4 is fixedly mounted on one side wall of the base platform 1. The measuring cylinder 4 in the embodiment is made of a transparent acrylic square. The measuring cylinder 4 is fixed on the side wall of the base platform 1 via a bolt. The outlet of the fluid outlet channel 2*e* is arranged on a side wall of the measuring cylinder 4. The fluid flowing out of the fluid outlet channel 2*e* directly flows into the measuring cylinder 4, to measure an outflow volume of the fluid. A discharge opening 9 with a drain valve 8 is arranged at a bottom of the measuring cylinder 4, facilitating the discharge of the fluid from the measuring cylinder 4 after experiment.

Except for the arrangement of the fluid inlet annular groove 2*b* and the fluid outlet annular groove 2*c* on the core column 2, two annular grooves are disposed at two ends close to the core column 2, and spiropyran polyurethane force-induced color-changing rings 10 are mounted inside the annular groove close to an end portion of the core column 2. The spiropyran polyurethane material is a material whose color can be changed according to the magnitude of the force. Elastic sealing rings 11 are mounted inside the annular groove close to the annular gap segment 2*a*, so that sealing is achieved between the two ends of the core column 2 and the through hole 3*a*. In this way, the fluid entering through the fluid inlet channel 2*d* sequentially passes through the fluid inlet opening 2*f*, the fluid inlet annular groove 2*b*, the annular gap, the fluid outlet annular groove 2*c* and the fluid outlet opening 2*g*, and then is discharged into the measuring cylinder 4 through the fluid outlet channel 2*e*.

After the core column 2 and the swing block 3 are mounted, the core column 2 and the through hole 3*a* are basically coaxial. To facilitate experimental adjustments of the positional relationship between the core column 2 and the through hole 3*a*, an adjustment assembly is arranged to rotate the swing block 3, to change a concentric degree between a surface of the core column 2 and an inner wall of the through hole 3*a*. In the embodiment, the adjustment assembly includes an adjustment screw 5 and elastic members. The elastic members are a plurality of springs 12, which are arranged at a C-shaped bottom of the base platform 1, and are pressed upwards on a lower side of a front portion of the swing block 3. The adjustment screw 5 is mounted at the cross beam 1*a* of the base platform 1, and the adjustment screw 5 is pressed downwards on an upper side of the front portion of the swing block 3. In this way, the front portion of the swing block 3 is lifted or lowered by turning the adjustment screw 5. A dial gauge 13 is also arranged on the cross beam 1*a*, and a measuring end of the dial gauge 13 is also pressed downwards on the upper side of the front portion of the swing block 3. As a distance sensor, the dial gauge 13 is configured to measure the movement of the front portion of the swing block 3. It is to be noted that, in addition to using the dial gauge 13 and a micrometer gauge as the distance sensor, non-contact distance sensors can be employed for measurement.

According to the fluid parameter measurement device with an annular gap in the embodiment, the relative position between the swing block 3 and the core column 2 can be changed by turning the adjustment screw 5, thereby changing the concentric degree of the annular gap 7, to meet experimental testing requirements. Meanwhile, the transparent swing block 3 is integrated with the spiropyran polyurethane force-induced color-changing ring 10, and when the concentric degree of the annular gap 7 is changed, the non-uniform stress acting on the spiropyran polyurethane force-induced color-changing ring 10 induces color change. It can also be more convenient for learners to observe the non-concentric state, and additionally, it is beneficial for observing the flow of fluid within the annular gap 7.

The invention claimed is:

1. A fluid parameter measurement device with an annular gap, comprising:

a base platform, a core column, and a swing block, wherein two side walls are arranged at the base platform, and two ends of the core column are fixedly connected to the side walls, respectively; a rotating shaft is arranged between the two side walls, and the rotating shaft is parallel to an axis of the core column; the swing block is connected to the base platform via the rotating shaft, and a through hole is disposed on the swing block; the core column is arranged inside the through hole in a penetration manner, the core column and two ends of the through hole are sealed with elastic sealing rings, and a surface of the core column and an inner wall of the through hole form an annular gap; a fluid inlet channel and a fluid outlet channel are disposed at the core column, the fluid inlet channel and the fluid outlet channel are in communication with two ends of the annular gap, respectively, and a pressurized liquid enters the annular gap through the fluid inlet channel and flows out of the fluid outlet channel; an adjustment assembly is arranged at the base platform, and the adjustment assembly pushes the swing block to rotate to alter a concentric degree between the surface of the core column and the inner wall of the through hole; an annular gap segment is arranged at the core column, a surface of the annular gap segment and the inner wall of the through hole form the annular gap, and a fluid inlet annular groove and a fluid outlet annular groove are disposed at two ends of the annular gap segment; and a plurality of fluid inlet openings in communication with the fluid inlet channel are disposed at a circumferential direction of the fluid inlet annular groove, and a plurality of fluid outlet openings are disposed at a circumferential direction of the fluid outlet annular groove.

2. The fluid parameter measurement device with an annular gap according to claim 1, wherein the adjustment assembly comprises elastic members and an adjustment screw, the elastic members and the adjustment screw are positioned on two sides of the swing block, respectively, and when the adjustment screw rotates, an elastic force exerted by the elastic members on the swing block is changed.

3. The fluid parameter measurement device with an annular gap according to claim 1, wherein a distance sensor is arranged on the base platform, and the distance sensor is configured to measure a swing distance of the swing block.

4. The fluid parameter measurement device with an annular gap according to claim 3, wherein the distance sensor is a micrometer gauge or a dial gauge.

5. The fluid parameter measurement device with an annular gap according to claim 1, wherein spiropyran polyurethane force-induced color-changing rings are arranged between the swing block and the core column, the spiropyran polyurethane force-induced color-changing rings are sleeved on the core column, and the swing block is transparent at a position of the spiropyran polyurethane force-induced color-changing ring.

6. The fluid parameter measurement device with an annular gap according to claim 1, wherein the fluid inlet openings are evenly distributed at the circumferential direction of the fluid inlet annular groove, and the fluid outlet openings are evenly distributed at the circumferential direction of the fluid outlet annular groove.

7. The fluid parameter measurement device with an annular gap according to claim 1, wherein an inlet of the fluid inlet channel and an outlet of the fluid outlet channel are disposed at the two ends of the core column.

8. The fluid parameter measurement device with an annular gap according to claim 1, wherein the outlet of the fluid outlet channel is connected to a measuring cylinder.

9. The fluid parameter measurement device with an annular gap according to claim 8, wherein the measuring cylinder is fixedly connected to the base platform, and a drain valve is arranged at a bottom of the measuring cylinder.

* * * * *